United States Patent [19]

Tamarchenko

[11] Patent Number: 5,809,458
[45] Date of Patent: Sep. 15, 1998

[54] METHOD OF SIMULATING THE RESPONSE OF A THROUGH-CASING ELECTRICAL RESISTIVITY WELL LOGGING INSTRUMENT AND ITS APPLICATION TO DETERMINING RESISTIVITY OF EARTH FORMATIONS

[75] Inventor: Tat'yana Tamarchenko, Houston, Tex.

[73] Assignee: Western Atlas International, Inc., Houston, Tex.

[21] Appl. No.: 708,561

[22] Filed: Sep. 5, 1996

[51] Int. Cl.⁶ ..................................................... G06F 19/00
[52] U.S. Cl. ................................................................. 702/9
[58] Field of Search .................................. 364/421, 422; 324/368, 369, 370

[56] References Cited

U.S. PATENT DOCUMENTS

| | | | |
|---|---|---|---|
| 4,875,015 | 10/1989 | Ward | 364/422 |
| 4,882,542 | 11/1989 | Vail, III | 324/368 |
| 5,065,100 | 11/1991 | Vail, III | 324/369 |
| 5,075,626 | 12/1991 | Vail, III | 324/368 |
| 5,223,794 | 6/1993 | Vail, III | 324/368 |
| 5,260,661 | 11/1993 | Vail, III | 324/369 |

OTHER PUBLICATIONS

Ce Liu et al., "Response of Electromagnetic–Pulse Logging Sonde in Axially Symmetrical Formation", IEEE Transactions on Geosciences and Remote Sensing, vol. 20, Iss. 2, Mar. 1991, pp. 214–221.

John Lovell et al., "Effect of Tool Eccentricity on Some Electrical Well–Logging Tools", IEEE Transactions on Geoscience and Remote Sensing, vol. 28, Iss. 1, Jan. 1990, pp. 127–136.

Qing–Huo Liu et al., "Modeling Low–Frequency Electrode–Type Resistivity Tools in 2–D Formations", Remote Sensing for the Nineties, 1993, pp. 273–275, Dec. 1993.

Weng Cho Chew, "Modeling of the Dielectric Logging Tool at High Frequencies: Applications and Results", IEEE Transactions on Geoscience and Remote Sensing, vol. 26, Iss. 4, Jul. 1988, pp. 388–398.

Went Cho Chew, "Modeling of the Dielectric Logging Tool at High Frequencies: Theory", IEEE Transactions on Geoscience and Remote Sensing, vol. 26, Iss. 4, Jul. 1988, pp. 382–387.

*Primary Examiner*—Donald E. McElheny, Jr.
*Attorney, Agent, or Firm*—Richard A. Fagin

[57] ABSTRACT

A method of simulating response of a through casing electrical resistivity well logging instrument to a set of simulated earth formations, cement and casing. A model of the earth formations, casing, cement and a configuration of electrodes on the instrument is initialized. Space surrounding the instrument is divided into segments. Conductance of each of the segments is calculated. A system of linear equations describing the electrical potential at each junction of segments is set up. The system expresses the balance of electrical current at each junction disposed outside the instrument and satifies the conditions that the potential on an outer surface of the space is zero, that the current normal to an insulating part of the instrument is zero, and that the potential is substantially equal at all junctions contained within one of the electrodes. The system of linear equations is solved by the conjugate gradient method with Incomplete Cholesky preconditioning. The electrical potential at each one of the electrodes is calculated so that an apparent resistivity as would be indicated by the instrument in the modeled earth formations can be determined.

7 Claims, 5 Drawing Sheets

METHOD OF SIMULATING THE RESPONSE OF A THROUGH-CASING ELECTRICAL RESISTIVITY WELL LOGGING INSTRUMENT AND ITS APPLICATION TO DETERMINING RESISTIVITY OF EARTH FORMATIONS

BACKGROUND OF THE INVENTION

1. Field of the Invention

The invention is related to the field of electrical resistivity well logging instruments. More specifically, the invention is related to numerical methods of simulating the response of electrical resistivity well logging instruments, particularly those adapted to measure resistivity of earth formations from within wellbores having a conductive casing.

2. Description of the Related Art

Electrical resistivity well logging instruments are used to measure the electrical resistivity of earth formations penetrated by wellbores. The measurements of electrical resistivity are used for, among other things, inferring the fluid content within the pore spaces of porous earth formations.

Instruments have been developed which can measure the electrical resistivity of earth formations from within a "cased" wellbore. A cased wellbore typically includes a steel pipe, or casing, cemented into the wellbore to maintain hydraulic isolation between various layers of the earth formations, and to maintain the mechanical integrity of the wellbore itself. These so-called "through casing" resistivity instruments generally operate on the principle of determining, at a measured or otherwise known potential, an amount of electrical current which "leaks" into the earth formation from a predetermined quantity of electrical current caused to flow along the casing. A representative through casing resistivity instrument is described in U.S. Pat. No. 5,543,715 issued to Singer et al.

Determining the magnitude of the leakage current typically includes measuring a second difference of electrical potentials (voltages) at spaced apart locations along the casing. The second difference of potentials is typically extremely small because the electrical resistivity of earth formations can range from about $10^{-2}$ to $10^{-3}$ ohm-meters, while the resistivity of the casing is on the order of $10^{-7}$ ohm-meters. The amount of leakage current, and its associated potential difference, is therefore typically only a tiny fraction of the total current flowing along the casing.

In order to determine the geologic structure of the earth formations which could cause a particular set of measurements to be made by a well logging instrument, it is known in the art to simulate numerically the response of the particular well logging instrument to a set of "model" earth formations having known physical properties, and to compare the numerical simulation result to the measurements actually made in the wellbore by the instrument. See for example, A. G. Barminsky et al, *Mathematical and Experimental Modeling of Microlaterolog Devices*, The Log Analyst, Society of Professional Well Log Analysts, Houston, Tex., 1991 (pp. 639–644).

Numerical simulation of the response of well logging instruments is most commonly performed as a two-dimensional representation of the wellbore and earth formations, whereby azimuthal symmetry of the formations around the axis of the wellbore is assumed. Numerical simulation in three-dimensions is more desirable for determining the geologic structures in cases where the layers of the earth formations are not perpendicular to the axis of the wellbore, or are azimuthally asymmetric. These cases are most common where the wellbore is drilled inclined from vertical, or the earth formations are highly inclined from horizontal (referred to as steeply dipping formations).

It has generally not been practical to simulate numerically in three dimensions, with great accuracy, the response of through casing resistivity instruments, such as the one described in the Singer et al '715 patent. Three-dimensional numerical simulation methods known in the art typically do not have sufficient accuracy to simulate the extremely small second difference in potential measurements made by the through casing resistivity instrument. The principal reason for the limitation of the methods known in the art for 3-dimensional numerical simulation is the contrast (or ratio) in resistivity between the casing and the earth formations, which, as previously described, can be as high as $10^{10}$.

Accordingly, the invention is intended to provide a method of numerically simulating the response of a through casing resistivity well logging instrument in three-dimensions.

SUMMARY OF THE INVENTION

The invention is a method of simulating the response of a through casing electrical resistivity well logging instrument. The method of simulation includes initializing a model set of earth formations penetrated by a cased wellbore. The model set includes formation resistivity values, inclination of the formation boundaries, wellbore casing size and conductance, and the electrode configuration of the instrument. The entire volume of space outside the instrument mandrel is divided into segments. The individual segments can be identified by number in the radial, axial and angular directions, where the origin is located coaxially with the instrument mandrel. The space outside the instrument is limited in size to a substantially cylindrical volume where the potential on its exterior surface is approximately zero. Electrical conductances of the segments are calculated using volume integration. A system of linear equations is set up. The system includes the boundary conditions that the outer surface of the space has substantially zero potential, the current on the insulating part of the mandrel which is normal to the mandrel axis is substantially zero, the potential at all nodes of each electrode on the mandrel is substantially equal, and that all the nodes outside the mandrel satisfy Kirchoff's law for the balance of currents. The system of linear equations can be solved using the conjugate gradient method with Incomplete Cholesky preconditioning. When the system of linear equations is solved for each set of input conditions, the potentials at each electrode can be calculated, and the apparent resistivity which would be indicated by the instrument can be determined.

In a specific embodiment of the invention, the apparent resistivity can be compared with the measurements made by the instrument in a wellbore to adjust the model earth formations. The adjustment can be made using inversion processes known in the art.

DESCRIPTION OF THE PREFERRED EMBODIMENT

The principle of measurement of electrical resistivity of earth formations from within a wellbore having a conductive casing is described, for example, in U.S. Pat. No. 5,543,715 issued to Singer et al. One aspect of the invention is to simulate numerically the response of an instrument such as the one described in the Singer et al '715 patent, to an assumed, or "model", set of earth formations having known electrical properties and geological structures. The simulated response can be compared to the measurements made by the well logging instrument of Singer et al '715 (or any similar "through casing" electrical resistivity well logging instrument) to infer the electrical resistivity and geologic structure of the earth formations surrounding the wellbore.

Figure 1:
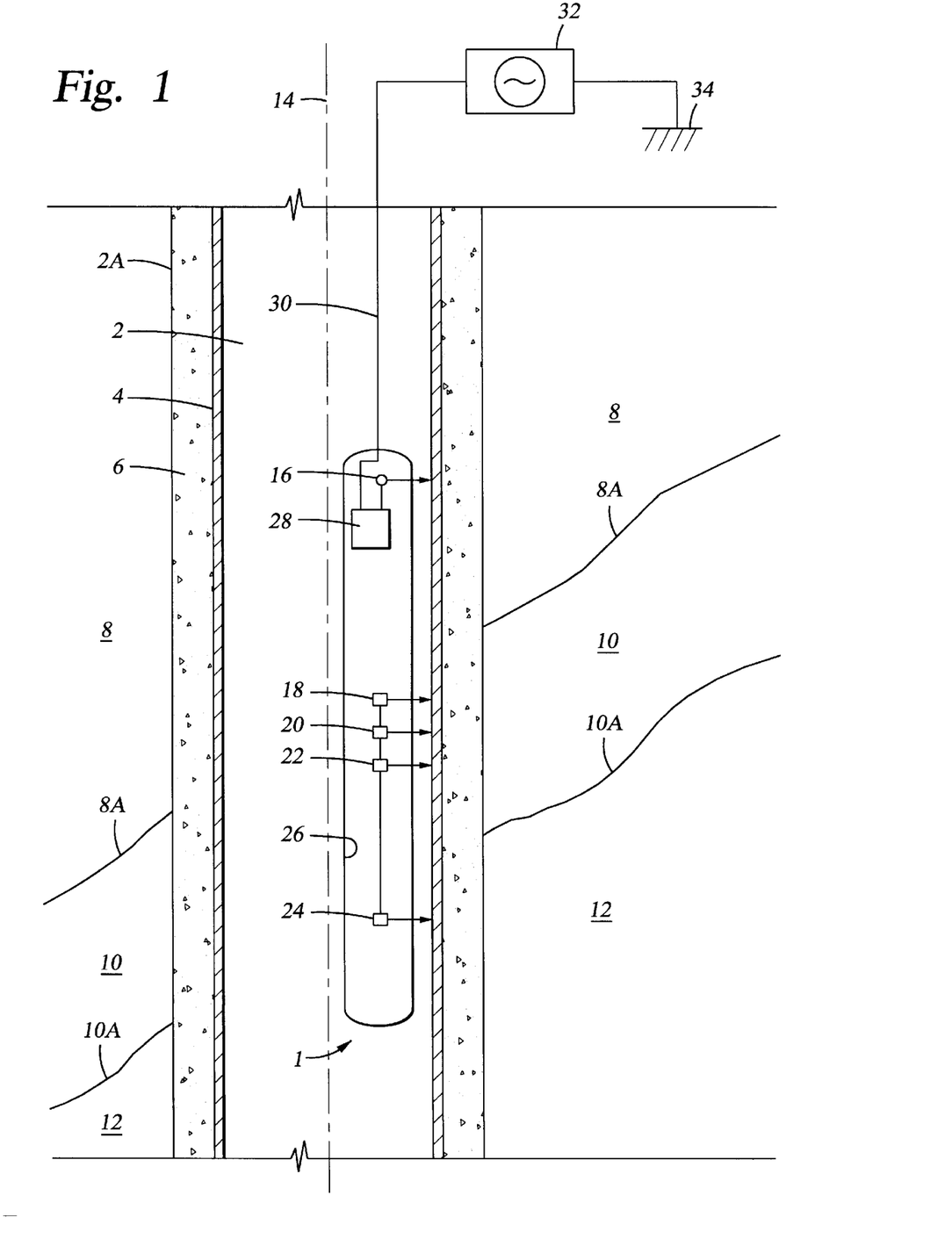
FIG. 1 shows a through casing resistivity well logging instrument disposed in a cased wellbore including model earth formations through which the wellbore is drilled.

The meaurements which are simulated by the invention can be better understood by referring to FIG. 1, which shows a wellbore 2 drilled through earth formations 8, 10, 12. The wellbore 2 includes a conductive casing 4, which is typically made of steel. The casing 4 is usually held in place by cement 6 pumped into an annular space between the exterior of the casing 4 and the wall 2A of the wellbore 2.

The earth formations 8, 10, 12 are shown as intersecting the wellbore 2 at an inclined angle. The orientation of this angle can be observed particularly at boundary 8A between formations 8 and 10, and at boundary 10A between formations 10 and 12. An inclined angle of intersection between the earth formations and the wellbore can occur as a result of the axis of the wellbore, shown at 14, being inclined from vertical, or the boundaries 8A, 10A being inclined from horizontal, or any combination of both. The result, in any case, is that the formations 8, 10, 12 are not azimuthally symmetric with respect to the wellbore axis 14. The response of certain well logging instruments can be affected by the azimuthal asymmetry of the formations shown in FIG. 1. As will be further explained, the response simulation of the invention can properly account for azimuthal asymmetry of geologic structure and physical properties of the earth formations.

The through casing electrical resistivity instrument (which can be similar to the one described in the Singer et al '715 patent) is shown at 1. The instrument 1 typically includes a current source electrode 16, a current return electrode 24, and measurement electrodes 18, 20, 22 axially spaced apart as shown along an insulating mandrel 26. The electrodes are connected to various switching and measuring circuits, shown generally at 28. Electrical current from a source 32, which can be located at the earth's surface, can be selectively applied to electrode 16 (by appropriate switching of circuits 28) and returned to electrode 24, or selectively returned to a surface return electrode 34. Voltages, and a second difference between voltages, can be selectively measured between electrodes 18, 20 and 22. The switching and measuring circuits 28 can include telemetry transceiver (not shown separately) for conducting the measurements of voltage and second difference to the earth's surface for interpretation and recording. Alternatively, the measurements may be stored in a recording unit (not shown) forming part of the switching and measuring circuits 28. As described in the Singer et al '715 patent, the magnitude of the differences in voltage and second difference of voltages between electrodes 18, 20 and 22 is related to the electrical resistivity of the earth formations 8, 10, 12 disposed outside the wellbore 2 and to the amount of current flowing along the casing 4.

The amount of current applied to the source electrode 16 and returned to either electrode 24 or 34 can either be measured or can be fixed at a predetermined magnitude during operation of the instrument 1. Measurement of voltage and second difference across the measuring electrodes 18, 20, 22 either is performed directly or is performed relative to a reference potential, such as the potential at the surface return electrode 34. The relationship between the current applied and the measured voltages can be represented as a system of linear equations in the form of:

$$A*V + B*I = F \quad (1)$$

where $V = (u_1, u_2, \ldots, u_M)^T$ represents the vectors of the voltages at the measure electrodes 18, 20, 22, $I = (i_1, i_2, \ldots, i_M)^T$ represents the vectors of the currents flowing through the surface of each electrode, and M represents the number of electrodes on the mandrel 26. A, B and F represent matrices related to the electrical response characteristics of the various measuring circuits 28 in the instrument 1. In the system described by equation (1) A, B, and F are generally known; V and I are desired to be determined in order to simulate the response of the instrument 1.

The response of the instrument 1 can be simulated by solving a boundary value problem for an elliptic partial differential equation which describes the electrical potential at any point in the space outside the instrument mandrel 26. The space outside the mandrel 26 can be defined by cylindrical coordinates, including a radial coordinate axis ρ having an origin coaxial with the axis of the mandrel 26, a cylinder axis substantially coaxial with the mandrel 26 and shown by z, and an angle subtended around the cylinder axis with respect to the radial coordinate axis, this angle shown as φ. The electrical potential u(ρ, φ, z) at any point in the space x=(ρ, φ, z) can be determined by solution to the following expression:

$$\frac{\partial}{\partial \rho} \rho \sigma \frac{\partial u}{\partial \rho} + \frac{\partial}{\partial \phi} \frac{\sigma}{\rho} \frac{\partial u}{\partial \phi} + \frac{\partial}{\partial z} \rho \sigma \frac{\partial u}{\partial z} = 0 \quad (2)$$

where σ, represents the conductivity of the earth formation at any point x=ρ, φ, z.

To solve equation (2) for every point in space outside the mandrel 26, it would normally be necessary to know either the potential or the current at each point along an inner boundary, which can be the surface of the mandrel 26, and an outer boundary. As will be further explained, the outer boundary can be assumed to be a substantially cylindrical surface having zero potential everywhere on its surface. The values of potential or current at every point on the surface of the mandrel 26 are not known, but it is possible to determine a relationship between the potentials at the electrodes and the total current flowing through each electrode by solution to the linear system of equations defined in equation (1).

On the insulating part of the surface of the mandrel 26, the current flowing normal to the surface of the mandrel 26 is substantially zero, that is:

$$\left. \frac{\partial u(x)}{\partial \rho} \right|_{x \in S_{mandrel}} = 0 \quad (3)$$

At an infinite distance from the origin O, where $|x| \to \infty$, the solution vanishes, that is, $u(x) \to 0$. The radial distance from the axis z which approximates this condition can generally be limited to about 15 kilometers. The outer boundary would then be along a cylindrical surface of radius 15 kilometers. The axial length of the cylindrical surface can reasonably be limited to about 15 kilometers on either side of the origin O.

The linear system in equation (1) includes a quantity M of equations and a quantity 2M of unknowns. To determine a unique solution to the linear system it is necessary to provide a quantity M of additional relationships between the potentials at each electrode $u_j$, (where j=1, 2, 3, . . . , M) and the total current flowing through each electrode $i_j$ (where j=1, 2, 3, . . . , M). The relationship between vector U and vector I is linear, so that:

$$I = \alpha \cdot U \tag{4}$$

where $\alpha$ represents a matrix M×M in dimension. $\alpha$ can be determined by the following process: first, the potential at one electrode is set to a known value, usually unity, while the other electrode potentials are set to zero. The current magnitude at each electrode can be determined by solution to equation (2) if the resistivities and geometries of the casing 4, formations 8, 10, 12, and the geometry of the instrument 1 are considered. The calculated magnitudes for this set of electrode potentials can be represented as a potential vector $U_1=(1, 0, 0, \ldots , 0)^T$, where vector $U_1$ includes a total of M elements (M being, as previously explained, the total number of electrodes). Solution to equation (2) for vector $U_1$ generates a current vector $I_1=(i_{11}, i_{21}, \ldots , i_{M1})$. A second potential vector $U_2=(0, 1, 0, \ldots , 0)^T$ can then be entered into equation (2) to generate a solution in the form of a current vector $I_2$. This process can be repeated for each potential vector through to a potential vector $U_M=(0, 0, \ldots , 1)^T$ to generate corresponding current vectors through to vector $I_M$. Matrix $\alpha$ then consists of current vectors $I_1, I_2, \ldots , I_M$.

Figure 2:
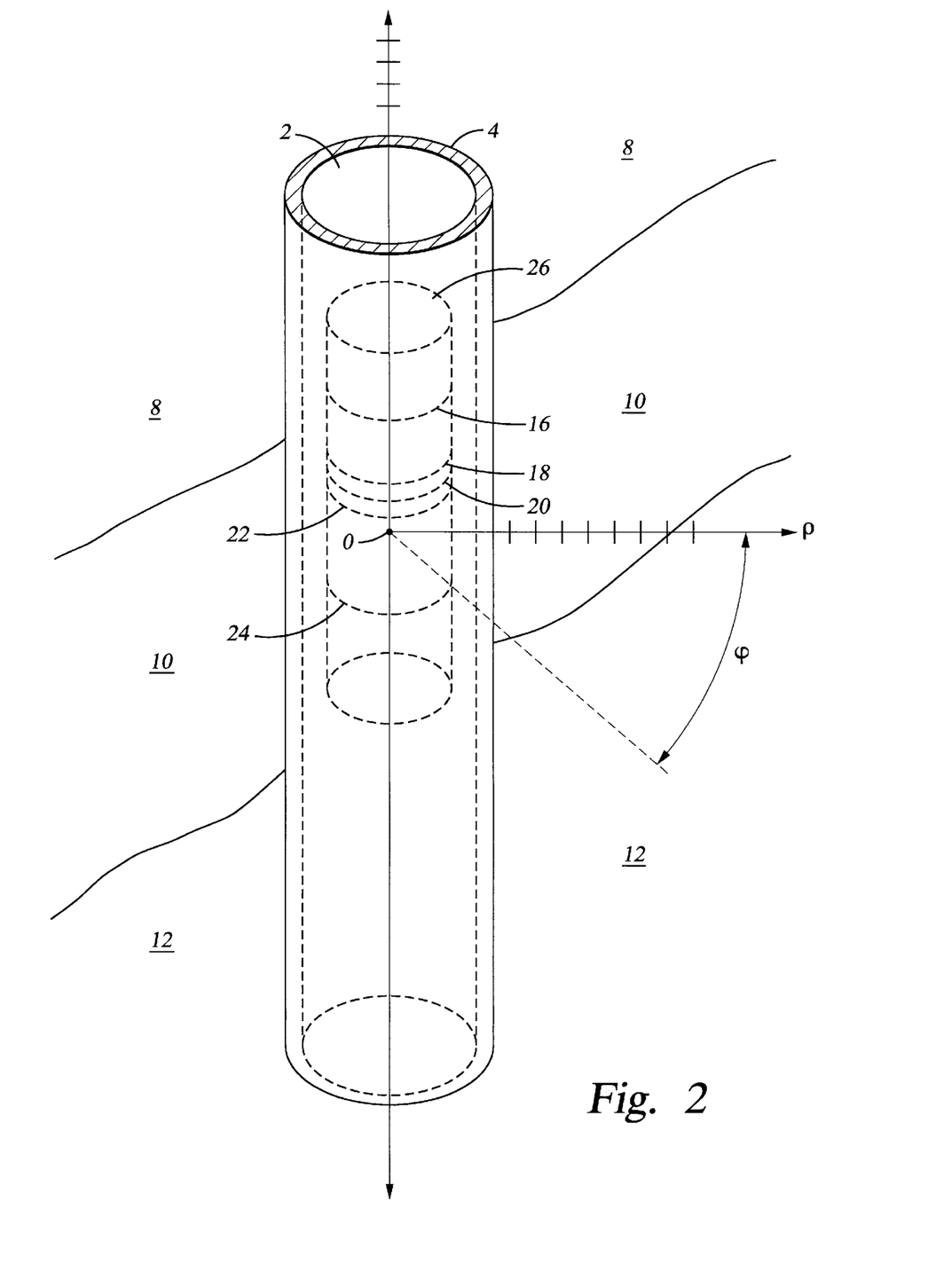
FIG. 2 shows a cylindrical coordinate system for segmenting the space surrounding the model instrument.
Figure 3:
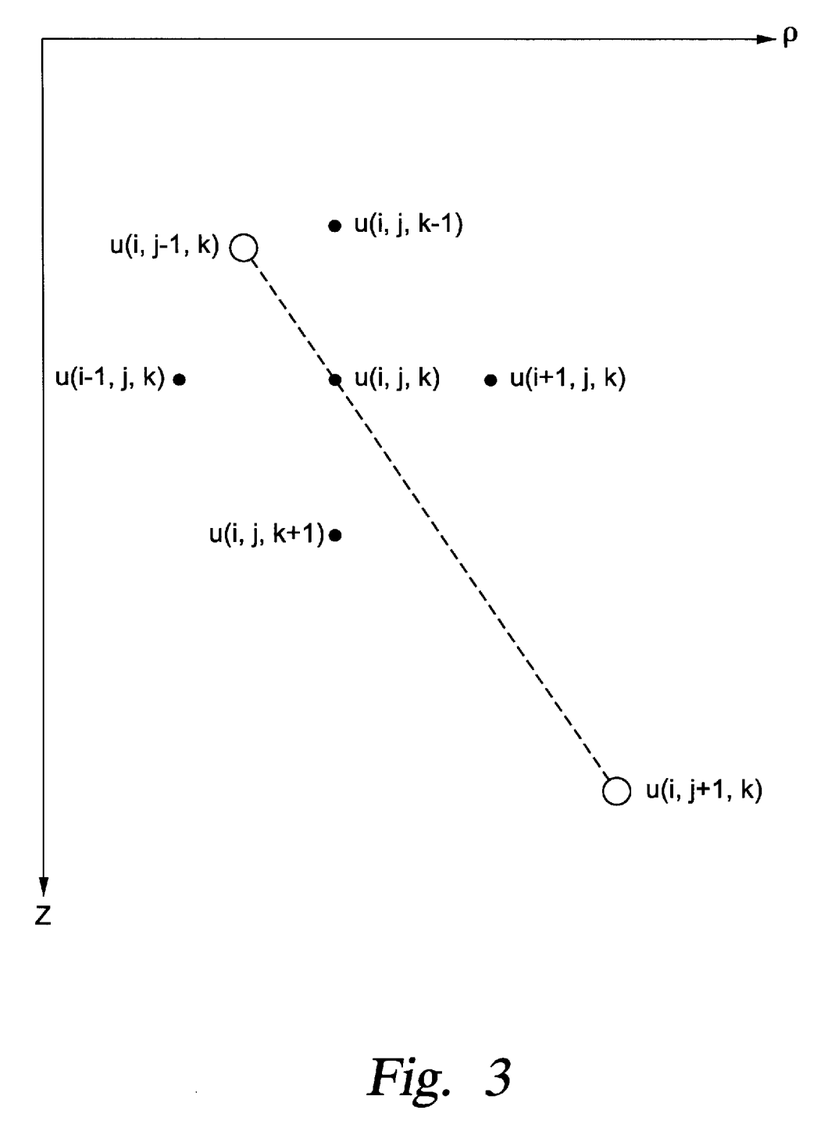
FIG. 3 shows the coordinate system index as applied to specific nodes, or junctions, in the segmented spaced surrounding the instrument.

An analytical solution for the potential at each point in space surrounding the instrument 1 would be impracticable to implement. In the invention, therefore, a numerical simulation of the solution is used. The numerical simulation of the solution to the boundary value problem described above can be better understood by referring to FIG. 2. The wellbore, casing and instrument mandrel previously shown in FIG. 1 are shown in FIG. 2 by their respective reference numerals as 2, 4 and 26. The instrument electrodes can be represented as generally cylindrical rings, shown at 16, 18, 20, 22 and 24, but it is to be understood that other electrode geometries could also be suitable, as long as the specific geometry of each electrode is known. The system of cylindrical coordinates can be designated as shown including the radial coordinate axis $\rho$, the cylinder axis substantially coaxial with the mandrel 26 and shown by z and the angle subtended around the cylinder axis with respect to the radial coordinate axis, shown by $\phi$. The origin O of the cylindrical coordinates is preferably located at the center of the simulation instrument, typically in the center of the mandrel 26. The space around the simulation instrument can be divided into discrete segments. The space includes a series of spaced apart points or "nodes", each of which can be designated by an index in the form of $X_{i,j,k}$. Each node represents the junction of segments. The index (i,j,k) for each particular node X indicates, respectively, the number of spaced apart locations along the radial coordinate axis $\rho$, the number of spaced apart locations along the cylinder axis z, and the number of increments of subtended angle $\phi$ from an arbitrary first position. The index corresponding to each one of the nodes can be better understood by referring to FIG. 3. FIG. 3 shows a two-dimensional section through the $\rho$-z plane. A particular node is shown at $u_{i,j,k}$ at which, as will be further explained, the electrical potential, u, is to be calculated. The electrical potential at any node depends on the potential at the adjacent nodes and the conductance of the material in the segments adjacent to that node. The nodes adjacent to node $u_{i,j,k}$ along the cylinder axis z can be designated by $u_{i,j,k-1}$ and $u_{i,j,k+1}$. Similarly, the adjacent nodes along the radial axis can be designated by $u_{i-1,j,k}$ and $u_{i+1,j,k}$. The adjacent nodes about the subtended angle, shown as being below and above the section through the ($\phi$-z) plane, can be represented by $u_{i,j-1,k}$ and $u_{i,j+1,k}$.

The potential at each node satisfies the following set of linear equations:

$$-a_{i,j,k}(u_{i+1,j,k} - u_{i,j,k}) + a_{i-1,j,k}(u_{i,j,k} - u_{i-1,j,k}) - \tag{5}$$

$$b_{i,j,k}(u_{i,j+1,k} - u_{i,j,k}) + b_{i,j-1,k}(u_{i,j,k} - u_{i,j-1,k}) -$$

$$c_{i,j,k}(u_{i,j,k+1} - u_{i,j,k}) + c_{i,j,k-1}(u_{i,j,k} - u_{i,j,k-1}) = 0$$

which represent Kirchoffs law for the balance of currents, $a_{i,j,k}$, $b_{i,j,k}$ and $c_{i,j,k}$ represent the electrical conductance (the inverse of the resistance) between adjacent nodes in the radial, azimuthal and axial directions, respectively. For nodes located entirely within the formations (8, 10, 12 in FIG. 1), the conductances can be calculated as volume integrals of the three dimensional conductivity over a "cell" having dimensions corresponding to the distances between adjacent nodes:

$$a_{i,j,k} = \int_{\delta z_k} \int_{\delta \phi_j} \frac{d\phi dz}{\int_{\Delta \rho_i} \frac{dr}{\rho \sigma}} \tag{6}$$

$$b_{i,j,k} = \int_{\delta z_k} \int_{\delta \rho_i} \frac{dz d\rho}{\rho \int_{\Delta \phi_j} \frac{d\phi}{\sigma}} \tag{7}$$

$$c_{i,j,k} = \int_{\delta \rho_i} \int_{\delta \phi_j} \frac{d\rho d\phi}{\frac{1}{\rho} \int_{\Delta z_k} \frac{dz}{\sigma}} \tag{8}$$

In equations (6), (7) and (8) the intervals of integration $\Delta \rho_i$, $\Delta \phi_j$ and $\Delta z_k$ can be represented by the expressions:

$$\Delta \rho_i = [\rho_{i-1}; \rho_i] \tag{9}$$
$$\Delta \phi_j = [\phi_{j-1}; \phi_j]$$
$$\Delta z_k = [z_{k-1}; z_k]$$

and:

$$\delta \rho_i = \left[ \frac{\rho_{i-1} + \rho_i}{2} ; \frac{\rho_i + \rho_{i+1}}{2} \right] \tag{10}$$

$$\delta \phi_j = \left[ \frac{\phi_{j-1} + \phi_j}{2} ; \phi_j + \frac{\phi_{j+1}}{2} \right]$$

$$\delta z_k = \left[ \frac{z_{k-1} + z_k}{2} ; \frac{z_k + z_{k+1}}{2} \right]$$

For nodes located along the casing 4, the casing conductivity is used to calculate the conductance in the axial and azimuthal directions, and the conductance in the radial direction is calculated using the conductivity of the formation outside the casing. Alternatively, the conductivity of the cement (shown as 6 in FIG. 1) can be used to calculate radial conductance in the annular space between the outside of the casing 4 and the surrounding earth formations.

At the nodes located on the surface of the mandrel 26, the equations describing the potential will be somewhat different, because there is no current flow from within the mandrel 26 itself (normal to the surface of the mandrel 26). For example, if the radial position of the mandrel 26 surface is defined so that the value of i is equal to one, at a node 1j,k on the surface of the mandrel 26 the balance of currents can be described by the equation:

$$-a_{1,j,k}(u_{2,j,k} - u_{1,j,k}) + b_{1,j,k}u_{1,j,k} - b_{1,j-1,k}u_{1,j,k} - \qquad (11)$$
$$c_{1,j,k}(u_{1,j,k+1} - u_{1,j,k}) + c_{1,j-1,k}(u_{1,j,k} - u_{1,j-1,k}) =$$
$$b_{1,j,k}V_1 - b_{1,j-1,k}V_2$$

Other conditions which exist on the surface of the mandrel 26 include that the potentials are equal at all the nodes which are located on any individual electrode.

The number of nodes which can be used to simulate the response of the instrument 1 can be determined by numerical expreiment. It has been determined through such experiment that a sufficient grid includes about 400 axial segments positioned within the axial span between the current source electrode 16 and the current return electrode 24. About forty radial segments can divide the space within about a 30 kilometer diameter space around the instrument 1, and the axial length of space outside the electrodes 16, 24 can be divided into about 50 segments extending over an axial length of about 15 kilometers above and below the instrument 1. The number of azimuthal segments can be about 20. The total number of nodes which results is about 0.5 million.

The resulting system of linear equations is generally known as a "sparse" system. Depending on the conductivity contrast between the casing and the formation, the number of electrodes and the geologic structure of the earth formations, the number of unknowns in the sparse system can run into the hundreds of thousands. A system known in the art for solving such a system of linear equations is called the "conjugate gradient" method. The conjugate gradient method is described, for example, in M. R. Hestenes et al, Method of Conjugate Gradients for Solving Linear Systems, Journal Res. Natl. Bur. Standards, vol. 49, pp 409–436 (1952).

In the method of the invention, the efficiency of solving the system of linear equations is improved by a preconditioning process known as Incomplete Cholesky decomposition. Incomplete Cholesky decomposition is described, for example, in J. A. Meijerink et al, *Guidelines for the Usage of Incomplete Decomposition in Solving Sets of Linear Equations as They Occur in Practical Problems*, Journal of Computational Physics, vol. 44, pp. 134–155, Academic Press, Inc., 1981.

The matrix representing the system of linear equations in equation (5) in the method of the invention can be referred to by G. A preconditioning matrix P can be defined so that:

$$P=(L+D)D^{-1}(L^T+D) \qquad (12)$$

where L represents a lower "triangular" matrix of matrix G, and D represents a diagonal matrix selected so that it has the property:

$$D=\text{diag}(G-LD^{-1}L^T) \qquad (13)$$

Each iteration of the conjugate gradient method previously described includes calculation of an inverse matrix $P^{-1}$ multiplied by a vector. The preconditioning can be completed by 24N multiplications and additions per iteration, where N represents the dimension of matrix G. Without preconditioning, the iteration generally requires 21N multiplications and additions. The total computational speed, however, can be increased by a factor of 10 to 100 by using the Incomplete Cholesky preconditioning.

The solution to the linear system of equations thus described can be used to estimate the magnitude of the voltages and second difference which would exist across the measuring electrodes (18, 20, 22 in FIG. 1) for any given set of earth formations and casing. The voltages and second differences can be calculated for various axial positions along the casing 4 to produce a simulated well log.

Figure 4:
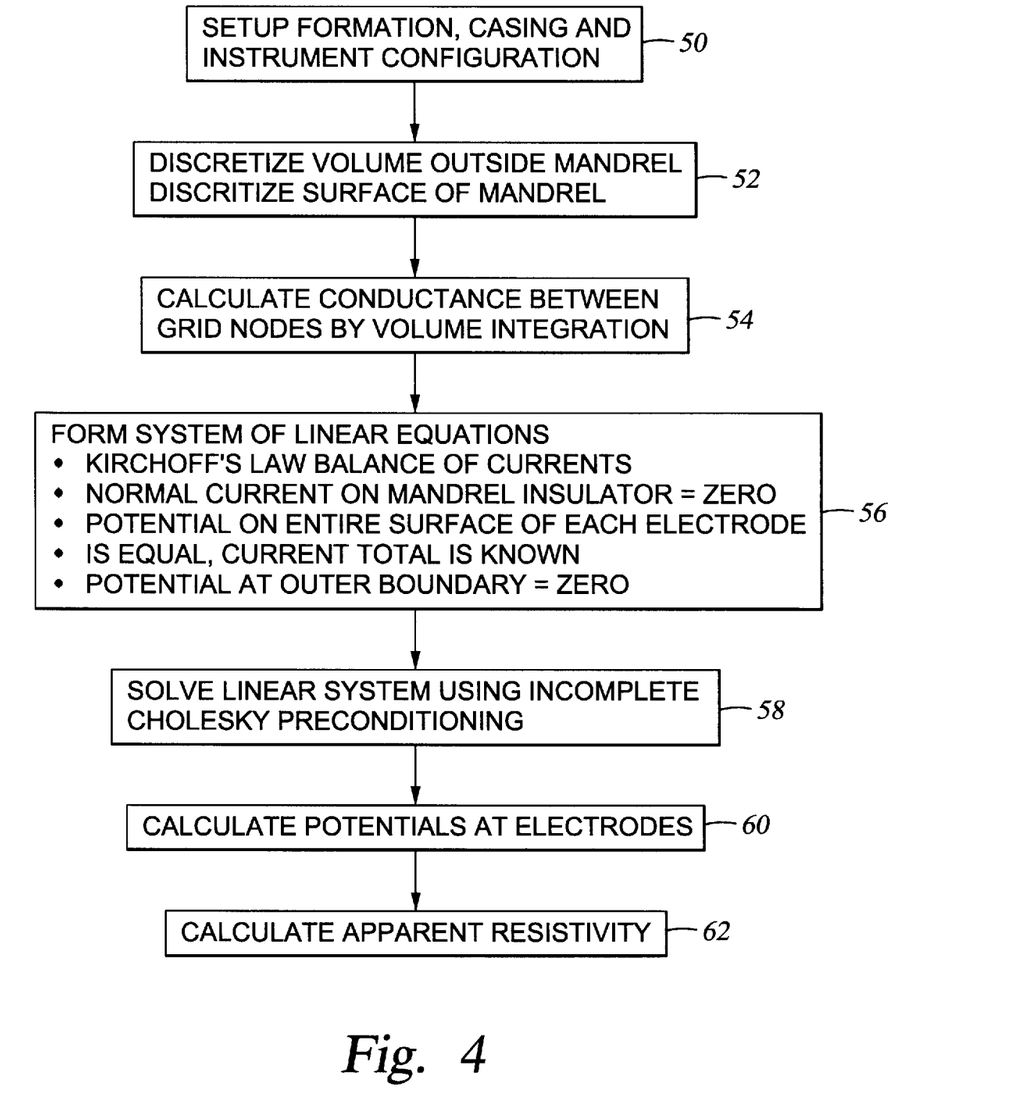
FIG. 4 shows a flow chart of the process of the invention.

Referring now to FIG. 4, a summary of the process of the invention will be described. The simulation set of earth formations including formation resistivity values, inclination of the formation boundaries, the casing size and conductance, and the electrical configuration of the instrument are initialized at step 50. The entire volume of space outside the instrument mandrel is divided into segments as shown at step 52. The individual segments can be identified by number in the radial, axial and angular directions where the origin can be located coaxial with the instrument mandrel. The space outside the instrument is limited to a substantially cylindrical volume where the potential on its surface is approximately zero. At step 54, electrical conductances between nodes of the segmented space are calculated using volume integration. At step 56, a system of linear equations is set up. The system includes the boundary conditions that the outer surface of the space has substantially zero potential, the current on the insulating part of the mandrel which is normal to the mandrel axis is substantially zero, the potentials at all nodes of each individual electrode are substantially equal, and that all the nodes outside the mandrel satisfy Kirchoff's law for the balance of currents. At step 58, the system of linear equations can be solved using the conjugate gradient method with Incomplete Cholesky preconditioning. When the system of linear equations is solved for each set of input conditions, the potentials at each electrode can be calculated as shown at 60, and the apparent resistivity which would be indicated by the instrument can be determined as shown at 62.

DESCRIPTION OF A SPECIFIC EMBODIMENT

Figure 5:
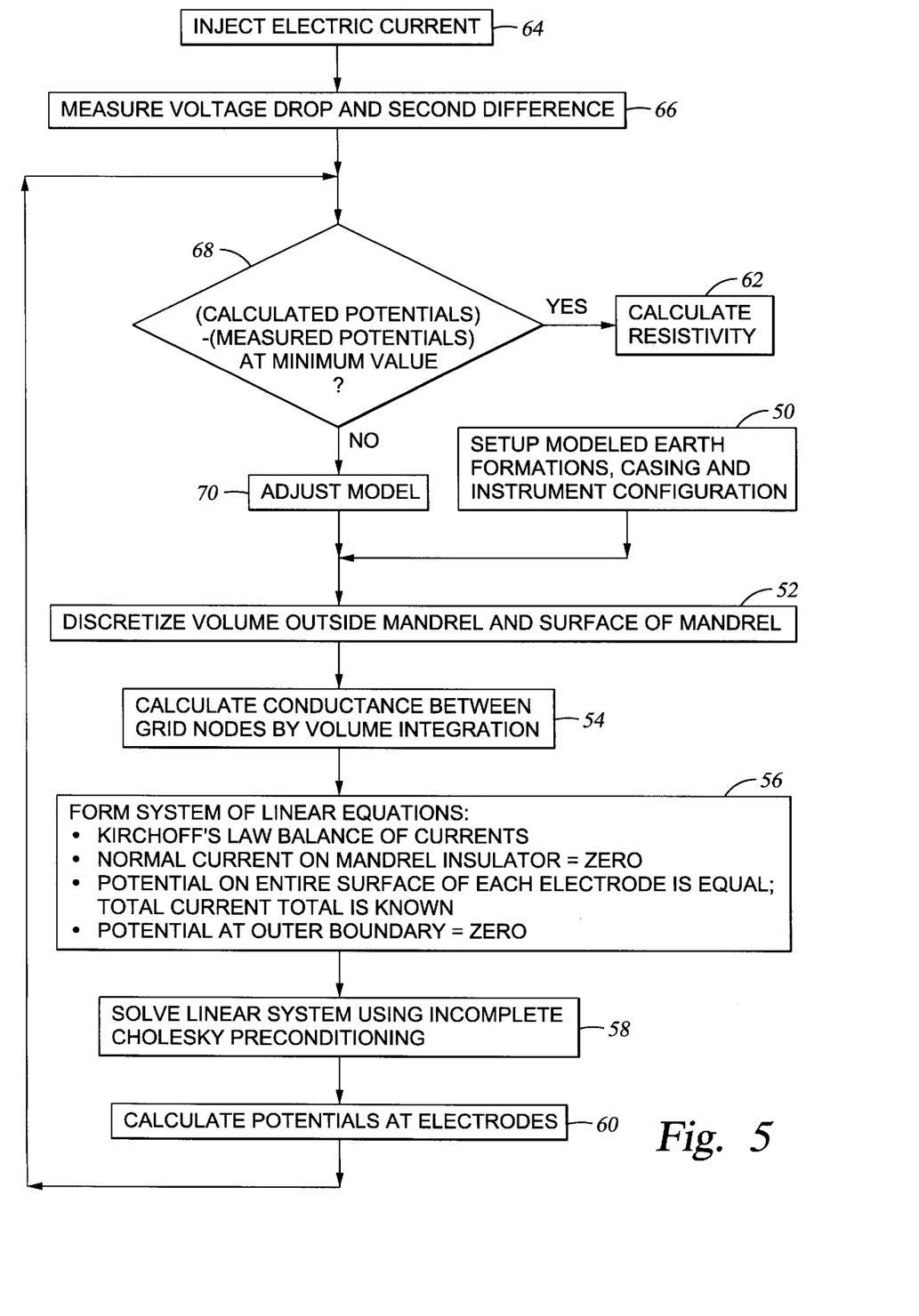
FIG. 5 is a flow chart of the method of the invention including determining formation resistivity by comparing simulated instrument response to measured instrument response.

The simulated well log which can be produced according to the first embodiment of the invention can be used in conjunction with an electrical resistivity well log recorded in a cased wellbore to refine the estimate of the geologic structures and resistivities of the earth formations. A through casing electrical resistivity well log can be measured and recorded by a method described in U.S. Pat. No. 5,543,715 issued to Singer et al. Generally, the method in the Singer et al '715 patent includes injecting electrical current on one electrode in contact with the casing in the wellbore, and returning this current to an electrode at the earth's surface, while measuring the voltage and second difference of voltages between spaced apart electrodes along the instrument in electrical contact with the casing. This is shown generally at 64 in FIG. 5. The casing resistance is "calibrated" by injecting current at a first electrode on the instrument, returning it at a second electrode on the instrument, and measuring voltage drop between a pair of electrodes disposed between the first and second electrodes. A "characteristic impedance" of the casing and formations is determined by injecting current at the first electrode and measuring voltage and second difference between the spaced apart electrodes. The current can be returned to another electrode on the instrument as long as the spaced apart (voltage measuring) electrodes are not disposed between the current source and current return electrodes. The voltage measurements and second difference measurements are used to determine the resistivity of the formation outside the casing. This is shown generally at 66 in FIG. 5.

Differences between the log measured according to the method in the Singer et al '715 patent, and the simulated well log generated by the process described in the first embodiment of the invention, can be used to adjust the properties and structure of the simulated earth formations used to generate the simulated well log. This is shown at 70 in FIG. 5. The simulated well log can be recalculated using the adjusted formation properties and geologic structure. The simulation formation parameters are adjusted 70, the simulation recalculated, shown at 52, 54, 56, 58 and 60 in FIG. 5, and the simulation result compared with the measured well log, and this process is repeated until the differences between the simulated well log and the measured well log reach a minimum value. This is shown at decision box 68 in FIG. 5. A suitable method, known as "inversion", for determining differences between the simulated well log and the measured well log, and subsequent adjustment of the simulated formation parameters is described, for example in, D. L. B. Jupp et al, *Stable Iterative Methods for the Inversion of Geophysical Data,* Geophysical Journal of the Royal Astronomy Society, vol. 42, 00. 957–976 (1975). The inversion method described in Jupp et al is not meant to be an exclusive representation of inversion methods which can be used to adjust the model of the earth formations used to simulate the instrument response, and therefore should not be construed as a limitation on the invention.

Those skilled in the art will devise other embodiments which do not depart from the spirit of the invention as described herein. Accordingly, the invention should be limited in scope only by the attached claims.

What is claimed is:

1. A method of determining electrical resistivity of earth formations penetrated by a wellbore, said wellbore having a conductive casing therein, the method comprising:

initializing a model of said earth formations, said casing, and a model configuration of electrodes on a through casing resistivity instrument;

dividing said model into segments;

calculating electrical conductance of each of said segments;

forming a system of linear equations describing electrical potential at each junction of said segments, said system satisfying the conditions that electrical current is balanced at each said junction disposed outside said instrument, that potential on an outer surface of said space is zero, that current normal to an insulating part of said instrument is zero, and that potential is substantially equal at all of said junctions contained within one of said electrodes;

solving said system of linear equations;

calculating potential at each one of said model electrodes;

injecting electrical current at one of said electrodes on said through casing resistivity instrument inserted into said wellbore;

measuring a voltage drop and a second difference of voltages between other ones of said electrodes;

comparing said measured voltage drop and said measured second difference to said calculated potential at each one of said model electrodes; and adjusting said model and repeating said steps of dividing, calculating conductance, forming said system of linear equations, solving said system and calculating said potential until differences between said measured voltages drop and second difference, and said calculated potential is reduced to a minimum.

2. The method as defined in claim 1 wherein said step of solving said system of linear equations includes Incomplete Cholesky preconditioning.

3. The method as defined in claim 1 wherein said steps of injecting electrical current and measuring said voltage drop comprise:

injecting said current at a first one of said electrodes and returning said current at a second one of said electrodes;

measuring said voltage drop between a pair of said electrodes disposed between said first and said second electrode so as to determine conductance of said casing;

measuring said voltage drop between a pair of said electrodes disposed axially externally to said first and said second electrode so as to determine a characteristic impedance of said casing and said earth formations; and injecting said current at said first electrode, measuring the potential on said casing, returning said current at the earth's surface and measuring said voltage drop and said second difference so as to determine an amount of electrical current leaking into said formation from said casing.

4. A method for determining electrical resistivity of earth formations penetrated by a wellbore, said wellbore having a conductive casing therein, the method comprising:

initializing a model of said earth formations, said casing, and a model configuration of electrodes on a through casing resistivity instrument;

dividing said model into segments;

calculating electrical conductance of each of said segments;

forming a system of linear equations describing electrical potential at each junction of said segments, said system satisfying the conditions that electrical current is balanced at each said junction disposed outside said instrument, that potential on an outer surface of said space is zero, that current normal to an insulating part of said instrument is zero, and that potential is substantially equal at all of said junctions contained within one of said electrodes;

solving said system of linear equations;

calculating potential at each one of said model electrodes;

comparing a measured voltage drop and a measured second difference to said calculated potential at each one of said model electrodes; and adjusting said model and repeating said steps of dividing, calculating conductance, forming said system of linear equations, solving said system and calculating said potential until differences between said measured voltages drop and second difference, and said calculated potential is reduced to a minimum.

5. The method as defined in claim 4 wherein said step of solving said system of linear equations includes Incomplete Cholesky preconditioning.

6. The method as defined in claim 4 wherein said measured voltage drop is determined by injecting electrical current at one of said electrodes on said through casing resistivity instrument inserted into said wellbore, and measuring said voltage drop and said second difference of voltages between other ones of said electrodes on said instrument.

7. The method as defined in claim 6 wherein said steps of injecting electrical current and measuring said voltage drop comprise:

- injecting said current at a first one of said electrodes and returning said current at a second one of said electrodes;
- measuring said voltage drop between a pair of said electrodes disposed between said first and said second electrode so as to determine conductance of said casing;
- measuring said voltage drop between a pair of said electrodes disposed axially externally to said first and said second electrode so as to determine a characteristic impedance of said casing and said earth formations; and
- injecting said current at said first electrode, measuring the potential on said casing, returning said current at the earth's surface and measuring said voltage drop and said second difference so as to determine an amount of electrical current leaking into said formation from said casing.

* * * * *